United States Patent
Shieh et al.

(10) Patent No.: US 10,996,518 B1
(45) Date of Patent: May 4, 2021

(54) LIGHT SWITCHABLE DEVICE

(71) Applicant: INDUSTRIAL TECHNOLOGY RESEARCH INSTITUTE, Hsinchu (TW)

(72) Inventors: Tien-Shou Shieh, Hsinchu (TW); Chien-Wei Lu, Hsinchu (TW); Pei-Hsin Chien, Taichung (TW); Huan-Yi Hung, Xiushui Township (TW); Mei-Rurng Tseng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/727,256

(22) Filed: Dec. 26, 2019

(51) Int. Cl.
*G02F 1/1337* (2006.01)
*G02F 1/1343* (2006.01)
(Continued)

(52) U.S. Cl.
CPC ........ *G02F 1/133707* (2013.01); *G02F 1/137* (2013.01); *G02F 1/1339* (2013.01);
(Continued)

(58) Field of Classification Search
CPC .................................................. G02F 1/1339
See application file for complete search history.

(56) References Cited

U.S. PATENT DOCUMENTS

| 9,575,352 B2 | 2/2017 | Weber et al. |
| 2016/0026026 A1* | 1/2016 | Kim ..................... G02F 1/13394 349/88 |

(Continued)

FOREIGN PATENT DOCUMENTS

| CN | 103197459 A | 7/2013 |
| CN | 204374563 U | 6/2015 |

(Continued)

OTHER PUBLICATIONS

Dierking, "Polymer Network-Stabilized Liquid Crystals," Advanced Materials, vol. 12, No. 3, 2000, pp. 167-181.
(Continued)

*Primary Examiner* — James A Dudek
(74) *Attorney, Agent, or Firm* — Birch, Stewart, Kolasch & Birch, LLP (57) ABSTRACT

A light switchable device is provided. The light switchable device includes a first conductive layer, a second conductive layer disposed opposite the first conductive layer, and a sealant layer disposed between the first conductive layer and the second conductive layer. The first conductive layer, the second conductive layer, and the sealant layer form a closed space. The light switchable device also includes a light switchable layer disposed in the closed space, wherein the light switchable layer includes a plurality of alignment structures and polymer-stabilized liquid crystals (PSLC). The plurality of alignment structures is disposed on the first conductive layer or the second conductive layer, and the PSLC's are distributed between the plurality of alignment structures. A height of the plurality of alignment structures is less than a height of the sealant layer, and greater than or equal to 5% of the height of the sealant layer.

12 Claims, 2 Drawing Sheets

(51) Int. Cl.
*G02F 1/137* (2006.01)
*G02F 1/1339* (2006.01)

(52) U.S. Cl.
CPC .... *G02F 1/13439* (2013.01); *G02F 1/134309* (2013.01); *G02F 1/13775* (2021.01)

(56) References Cited

U.S. PATENT DOCUMENTS

| | | | |
|---|---|---|---|
| 2016/0062157 | A1* | 3/2016 | Kim ............... G02F 1/1337 349/33 |
| 2017/0242282 | A1 | 8/2017 | Yamada et al. |
| 2017/0351141 | A1* | 12/2017 | Kubota ............ G02F 1/13394 |
| 2018/0113335 | A1* | 4/2018 | Jin ............... G02F 1/13394 |
| 2019/0011788 | A1* | 1/2019 | Wang ............... G02F 1/1339 |

FOREIGN PATENT DOCUMENTS

| | | |
|---|---|---|
| CN | 106200097 A | 12/2016 |
| CN | 106324884 A | 1/2017 |
| CN | 106773374 A | 5/2017 |
| CN | 1068861002 A | 6/2017 |
| CN | 104965372 B | 3/2018 |
| CN | 105158958 B | 8/2018 |
| CN | 106405916 B | 4/2019 |
| TW | 541560 B | 7/2003 |
| TW | I379161 B | 12/2012 |
| TW | I381226 B | 1/2013 |
| TW | I528048 B | 4/2016 |
| TW | I575263 B | 3/2017 |
| TW | I613514 B | 2/2018 |
| WO | WO 2018/000838 A1 | 1/2018 |
| WO | WO 2018/223902 A1 | 12/2018 |

OTHER PUBLICATIONS

Hicks et al., "Polymer Stabilized VA Mode Liquid Crystal Display," Journal of Display Technology, vol. 7, No. 11, Nov. 2011, pp. 619-623.

Kumar et al., "Advancements of vertically aligned liquid crystal displays," Micron, vol. 81, 2016 (Available online Dec. 9, 2015), pp. 34-47.

Lee et al., "Enhanced contrast ratio and viewing angle of polymer-stabilized liquid crystal via refractive index matching between liquid crystal and polymer network," Optics Express, vol. 21, No. 22, Nov. 4, 2013, pp. 26914-26920.

Lin et al., "A Polarizer-Free Electro-Optical Switch Using Dye-Doped Liquid Crystal Gels," Materials, vol. 2, Oct. 26, 2009, pp. 1662-1673 (13 pages total).

* cited by examiner

LIGHT SWITCHABLE DEVICE

BACKGROUND

Technical Field

The present disclosure relates to a light switchable device including polymer-stabilized liquid crystal (PSLC).

Description of the Related Art

In the composition of liquid crystal/polymer dispersion, polymer-dispersed liquid crystals (PDLC) are known for having a lower content of liquid crystals. Liquid crystals in a microencapsulation shape are evenly dispersed in a polymer matrix with an continuous phase. In contrast, polymer-stabilized liquid crystals (PSLC) are known for having a higher content of liquid crystals, which are then in a continuous phase. Polymer networks are dispersed in liquid crystals.

For PDLC structures, when no external voltage is applied, the effective refractive indices of liquid crystals and polymers do not match. Incident light is severely dispersed, causing a thin film to form in a dispersed state (such as an opaque state or an off state). As voltage is applied, liquid crystals will arrange themselves, and they will be perpendicular to the substrate surface. Because the effective refractive indices of liquid crystals and polymers match, vertical incident light will pass through without the interface experiencing any interference, causing a thin film to form in a transparent state (such as an on state). For PSLC structures, under an external voltage, liquid-crystal molecules will be parallel to the conductive layer, and they will become opaque. Without any voltage, liquid-crystal molecules are perpendicular to the conductive layer, and they become transparent.

When an external voltage is applied to PDLC film, the PDLC film becomes transparent. In other words, if maintaining a transparent state is desired, a continuous supply of voltage is required. In actual application, the film often needs to be in a light-through state on many occasions, and only rarely does the film need to be in a light-shielding state. Therefore, using PDLC film on many occasions will certainly result in energy consumption.

SUMMARY

The present disclosure provides a light switchable device. The light switchable device comprises a first conductive layer, a second conductive layer disposed opposite the first conductive layer, and a sealant layer disposed between the first conductive layer and the second conductive layer. The first conductive layer, the second conductive layer, and the sealant layer form a closed space. The light switchable device also comprises a light switchable layer disposed in the closed space, wherein the light switchable layer comprises a plurality of alignment structures and polymer-stabilized liquid crystals (PSLC), the plurality of alignment structures is disposed on the first conductive layer, or on the second conductive layer, and the PSLC's are distributed between the plurality of alignment structures, wherein a height of the plurality of alignment structures is lower than a height of the sealant layer, and greater than or equal to 5% of the height of the sealant layer.

To more clearly understand the features and advantages of the present disclosure, some preferred examples of the disclosure will be described in detail with the accompanying drawings.

DETAILED DESCRIPTION

Figure 1:
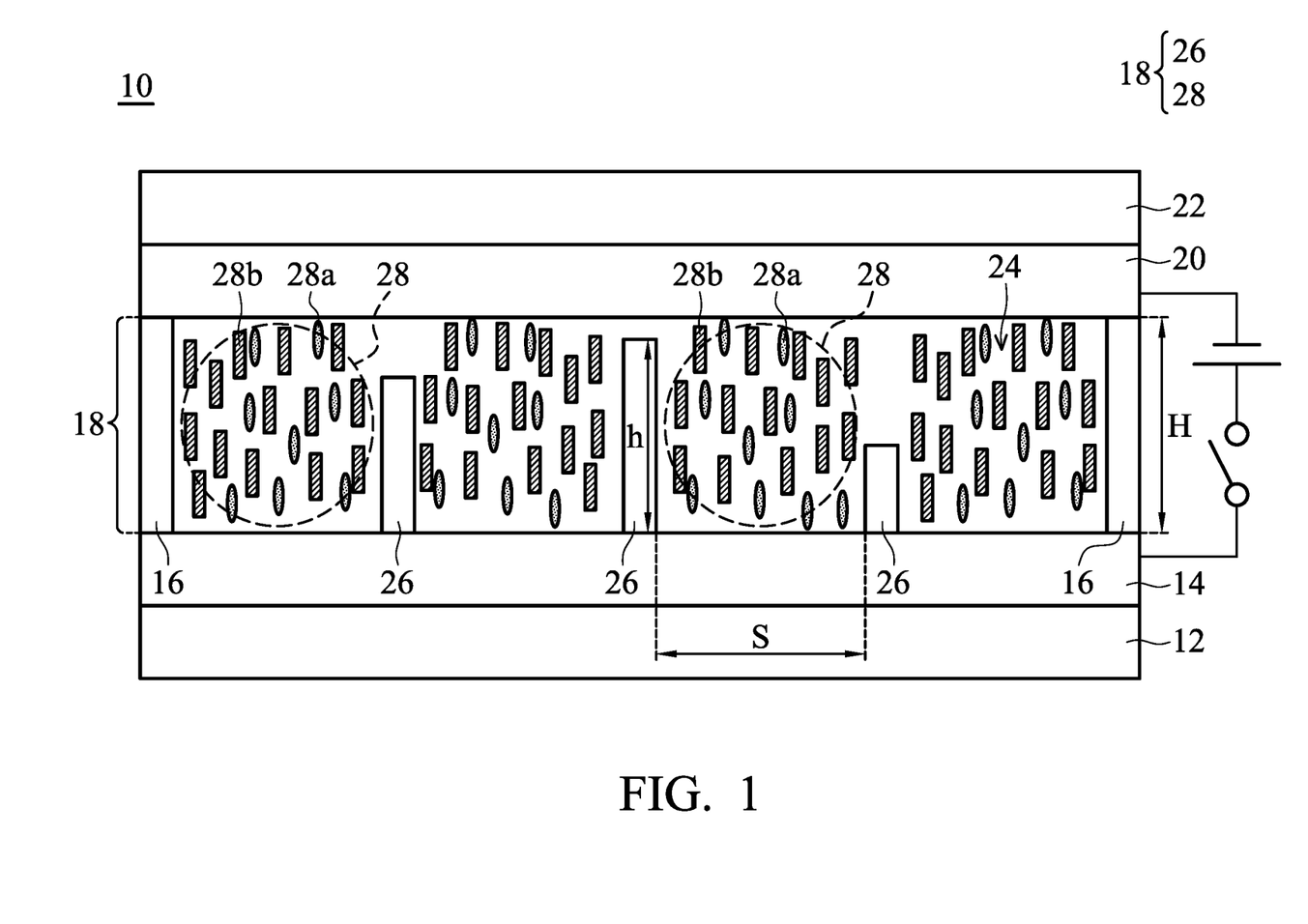
FIG. 1 is a cross-sectional view of a light switchable device, including the arrangement of the polymer-stabilized liquid crystals (PSLC) without an external voltage being applied, according to some examples of the present disclosure.

Refer to FIG. 1. According to some examples of the present disclosure, a light switchable device 10 is provided. FIG. 1 is a cross-sectional view of the light switchable device 10.

As shown in FIG. 1, the light switchable device 10 includes a first substrate 12, a first conductive layer 14, a sealant layer 16, a light switchable layer 18, a second conductive layer 20, and a second substrate 22. The first conductive layer 14 is disposed on the first substrate 12. The second conductive layer 20 is disposed on the second substrate 22. The second conductive layer 20 and the first conductive layer 14 are disposed opposite from each other. A sealant layer 16 is then disposed between the first conductive layer 14 and the second conductive layer 20. The first conductive layer 14, the second conductive layer 20, and the sealant layer 16 form a closed space 24. The light switchable layer 18 is disposed in the closed space 24. The light switchable layer 18 includes a plurality of alignment structures 26 and polymer-stabilized liquid crystals (PLSC) 28. The alignment structures 26 are disposed on the first conductive layer 14, and the PSLC's 28 are distributed between the alignment structures 26. It is worth noting that the height h of the alignment structures 26 is lower than the height H of the sealant layer 16, and greater than or equal to 5% of the height H of the sealant layer 16.

In some examples, the first substrate 12 and the second substrate 22 may include, for example, glass or polyethylene terephthalate (PET).

In some examples, the first conductive layer 14 and the second conductive layer 20 may include, for example, indium tin oxide (ITO).

In some examples, the height H of the sealant layer 16 is between 5 μm and 100 μm. In some examples, the alignment structures 26 may be made of epoxy resin, acrylate resin, or a combination thereof. In some examples, the alignment structures 26 may be made of bisphenol A epoxy resin, hydrogenated bisphenol A epoxy resin, bisphenol F epoxy resin, hydrogenated bisphenol F epoxy resin, aliphatic epoxy resin, cycloaliphatic epoxy resin, or a combination thereof. In some examples, the alignment structures 26 may be made of polyurethane acrylate, polyester acrylate, polyacrylic acid, epoxy acrylate, or a combination thereof. In some examples, the shape of the alignment structures 26 may be cylindrical, cuboid, oblate ellipsoid, square-cylindrical, diamond, or irregular, for example. In some examples, when the alignment structures 26 are cylindrical or oblate ellipsoid-shaped, their diameter is between 50 μm and 800 μm. In some examples, when the alignment structures 26 are cuboid or square-cylindrical, their side length is between 200 μm and 500 μm. In some examples, when the alignment structures 26 are diamond-shaped or irregularly shaped, their diagonal length is between 0.8 mm and 5 mm. In some examples, the height h of the alignment structures 26 is between 5 μm and 100 μm. In some examples, there is a space S between the alignment structures 26 of between 500 μm and 15 mm. In some examples, a sum of the bottom areas of the alignment structures 26 is between 3% and 65% of a total area of the light switchable device 10. For example, of the unit area of 1 mm$^2$, the sum of the bottom areas of the alignment structures 26 is between 0.03 mm$^2$ and 0.65 mm$^2$.

In some examples, the content of polymers 28a in the PSLC's 28 is between 2.5 wt % and 4.5 wt %. In some examples, the content of liquid-crystal molecules 28b in the PSLC's 28 is between 95 wt % and 97 wt %.

In some examples, at the moment when an external voltage is applied, the arrangement or orientation of the liquid-crystal molecules 28b in PSLC's 28 is essentially parallel with the alignment structures 26, as shown in FIG. 1, so the light switchable layer 18 may appear transparent.

Figure 2:
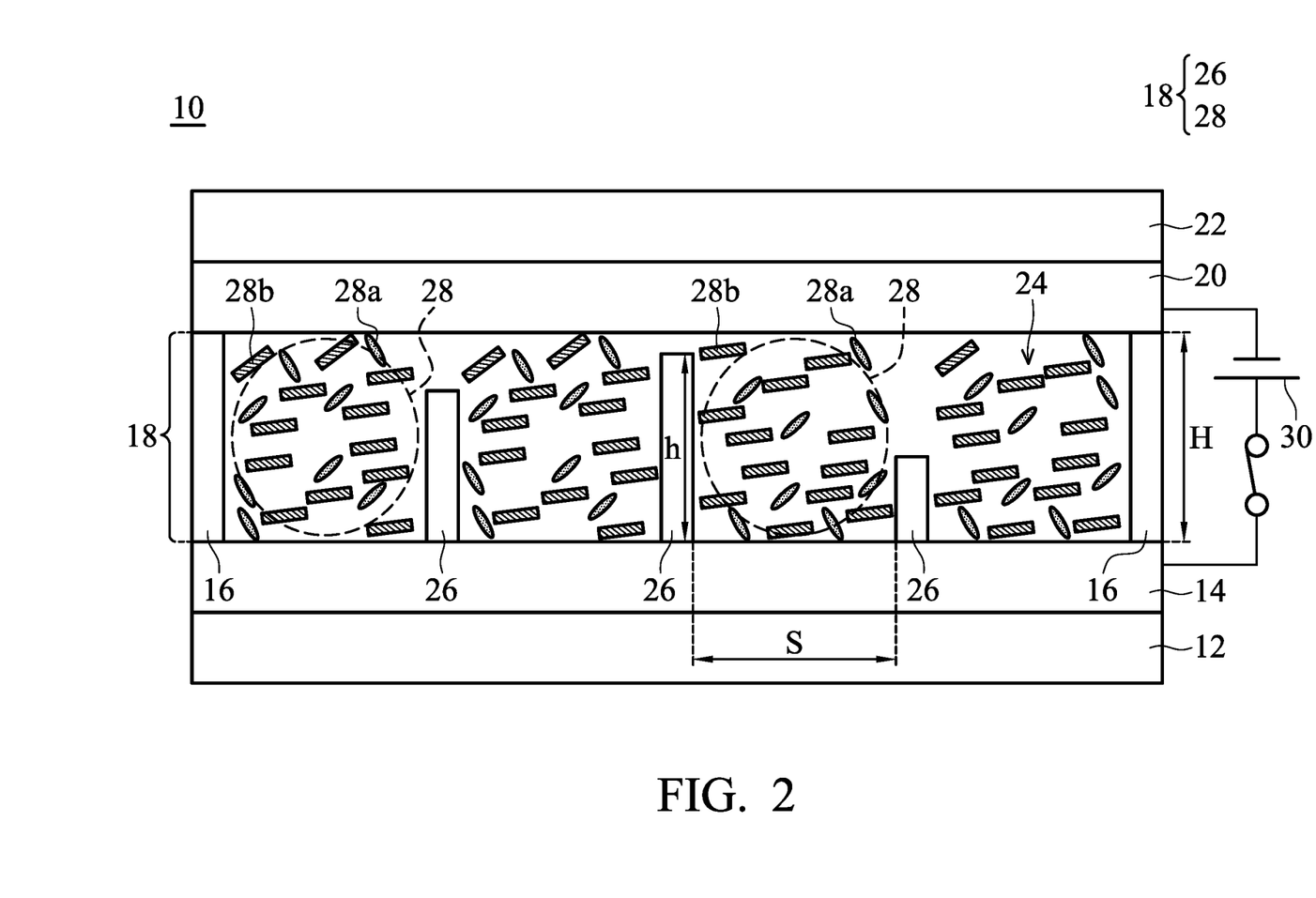
FIG. 2 is a cross-sectional view of a light switchable device, including the arrangement of PSLC's with an external voltage being applied, according to some examples of the present disclosure.

In some examples, when an external voltage 30 is applied, the arrangement or orientation of the liquid-crystal molecules 28b in PSLC's 28 will immediately transform to be perpendicular to the orientation of the alignment structures 26, as shown in FIG. 2. At this moment, due to the formation of light-shielding state, the light switchable layer 18 may appear to be in haze state.

The present disclosure uses the alignment structures disposed on the conductive layer, and in contact with PSLC's, allowing the light switchable layer in the device to appear transparent, without the need to apply an external voltage. When an external voltage is applied, the light switchable layer may appear hazy, realizing the transformation from a transparent state to haze state, to achieve light switchable purpose. The structure of the present disclosure is easy to design, simple to realize in production, and more energy efficient and convenient for photoelectric components requiring transparency most of the time.

EXAMPLES/COMPARATIVE EXAMPLES

Example 1

Preparation of the Light Switchable Device (1)

First, a screen dot glue composition (including 60 parts by weight of bisphenol A epoxy resin (Chang Chun Group, code BE501), 36 parts by weight of bisphenol F epoxy resin (DIC, code 830S), 4 parts by weight of cation photo initiator (including diphenyl(4-phenylthio)phenylsulfonium hexafluoroatimonate, (thiodi-4,1-phenylene)bis(diphenylsufonium) dihexafluoroatimonate) (code 1176)) was screen-printed onto a 10 cm×10 cm ITO/glass substrate, using a screen printing method, to form a screen dot matrix with an oblate ellipsoid shape, with approximately 200 μm in diameter, approximately 8 μm to 10 μm of height, and approximately 700 μm to 800 μm of space. It was then subjected to UV light (energy of 500 mJ/cm$^2$) for pre-exposure. Next, the same screen dot glue composition was coated onto another ITO/glass substrate by doctor blade, to form the peripheral sealant layer of 25 μm in height, leaving only capillary pores to be filled with liquid crystals subsequently. After that, the ITO/glass substrate with the sealant layers was attached with the ITO/glass substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of lauryl methacrylate (TCI, code LMA), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 1.

Example 2

Preparation of the Light Switchable Layer (2)

First, a screen dot glue composition (including 40 parts by weight of urethane acrylate oligomer (viscosity 25,000 cps @ 25° C.) (Sartomer, code CN997), 45 parts by weight of acrylic oligomer (viscosity 20,000 cps to 32,000 cps @ 25° C.) (code DOUBLEMER 3710), 10 parts by weight of polyester acrylate oligomer (viscosity 52,000 cps @ 25° C.) (code CN2200), 5 parts by weight of free radical photo initiator (bis(2,4,6-trimethylbenzoyl)-phenylphosphineoxide) (Double Bond Chemical, code 819)) was screen-printed onto a 10 cm×10 cm ITO/glass substrate, using a screen printing method, to form a screen dot matrix with an square-cylindrical shape, with approximately 500 μm of side length, approximately 30 μm to 35 μm of height, and approximately 700 m to 800 μm of space. It was then subjected to UV light (energy of 500 mJ/cm$^2$) for pre-exposure. Next, the same screen dot glue composition was coated onto another ITO/glass substrate by doctor blade, to form the peripheral sealant layer of 100 μm in height, leaving only capillary pores to be filled with liquid crystals subsequently. After that, the ITO/glass substrate with the sealant layers was attached with the ITO/glass substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of lauryl methacrylate (TCI, code LMA), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 1.

Example 3

Preparation of the Light Switchable Layer (3)

First, a screen dot glue composition (including 35 parts by weight of urethane acrylate oligomer (viscosity 25,000 cps @ 25° C.) (Sartomer, code CN997), 40 parts by weight of acrylic oligomer (viscosity 20,000 cps to 32,000 cps @ 25° C.) (code DOUBLEMER 3710), 20 parts by weight of polyester acrylate oligomer (Viscosity 52,000 cps @ 25° C.) (code CN2200), 5 parts by weight of free radical photo initiator (bis(2,4,6-trimethylbenzoyl)-phenylphosphineoxide) (Double Bond Chemical, code 819)) was screen-printed onto a 10 cm×10 cm ITO/glass substrate, using a screen printing method, to form a screen dot matrix with an oblate ellipsoid shape, with approximately 800 μm in diameter, approximately 30 μm to 35 μm of height, and approximately 700 μm to 800 μm of space. It was then subjected to UV light (energy of 500 mJ/cm$^2$) for pre-exposure. Next, the same screen dot glue composition was coated onto another ITO/glass substrate by doctor blade, to form the peripheral sealant layer of 50 μm in height, leaving only capillary pores to be filled with liquid crystals subsequently. After that, the ITO/glass substrate with the sealant layers was attached with the ITO/glass substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of ethoxylated bisphenol A dimethacrylate (Sartomer, code SR601), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 1.

Example 4

Preparation of the Light Switchable Layer (4)

First, a screen dot glue composition (including 55 parts by weight of bisphenol A epoxy resin (Chang Chun Group, code BE501), 41 parts by weight of accelerated epoxidized hydrogenated bisphenol A (CVC Thermoset Specialties, code EPA5001), 4 parts by weight of cation photo initiator (including diphenyl(4-phenylthio)phenylsulfonium hexafluoroatimonate, (thiodi-4,1-phenylene)bis(diphenylsufonium) dihexafluoroatimonate) (code 1176)) was screen-printed onto a 10 cm×10 cm ITO/PET substrate, using a screen printing method, to form a screen dot matrix with an cuboid shape, with approximately 200 μm to 500 μm of short-side length, approximately 70 μm to 80 μm of height, and approximately 1.6 mm to 2.0 mm of space. It was then subjected to UV light (energy of 500 mJ/cm$^2$) for pre-exposure. Next, the same screen dot glue composition was coated onto another ITO/PET substrate by doctor blade, to form the peripheral sealant layer of 100 μm in height, leaving only capillary pores to be filled with liquid crystals subsequently. After that, the ITO/PET substrate with the sealant layers was attached with the ITO/PET substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystal (ne=1.6567, Δn=0.1647 at λ=589 nm; Δε=−5.7 at f=1 kHz) (Merck, code ZLI-4788), 4.5 parts by weight of ethoxylated bisphenol A dimethacrylate (Sartomer, code SR601), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 1.

Example 5

Preparation of the Light Switchable Layer (5)

First, a screen dot glue composition (including 60 parts by weight of bisphenol A epoxy resin (Chang Chun Group, code BE501), 36 parts by weight of bisphenol F epoxy resin (DIC, code 830S), 4 parts by weight of cation photo initiator (including diphenyl(4-phenylthio)phenylsulfonium hexafluoroatimonate, (thiodi-4,1-phenylene)bis(diphenylsufonium) dihexafluoroatimonate) (code 1176)) was randomly spotted onto a 5 cm×5 cm ITO/glass substrate, by metal stirring rod, to form a screen dot matrix with an irregular shape, with approximately 0.8 mm to 5.0 mm of diagonal length, approximately 70 μm to 80 μm of height, and approximately 10 mm to 15 mm of space. It was then subjected to UV light (energy of 500 mJ/cm$^2$) for pre-exposure. Next, the same screen dot glue composition was coated onto another ITO/glass substrate by doctor blade, to form the peripheral sealant layer of 100 μm in height, leaving only capillary pores to be filled with liquid crystals subsequently. After that, the ITO/glass substrate with the sealant layers was attached with the ITO/glass substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystal (ne=1.6567, Δn=0.1647 at λ=589 nm; Δε=−5.7 at f=1 kHz) (Merck, code ZLI-4788), 4.5 parts by weight of ethoxylated bisphenol A dimethacrylate (Sartomer, code SR601), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 1.

Example 6

Preparation of the Light Switchable Layer (6)

First, a screen dot glue composition (including 50 parts by weight of bisphenol A epoxy resin (Chang Chun Group, code BE501), 20 parts by weight of bisphenol F epoxy resin (DIC, code 830S), 3 parts by weight of cation photo initiator (including diphenyl(4-phenylthio)phenylsulfonium hexafluoroatimonate, (thiodi-4,1-phenylene)bis(diphenylsufonium) dihexafluoroatimonate) (code 1176)), 10 parts by weight of urethane acrylate oligomer (viscosity 25,000 cps @ 25° C.) (Sartomer, code CN997), 15 parts by weight of acrylic oligomer (viscosity 20,000 cps to 32,000 cps @25° C.) (code DOUBLEMER 3710), 2 parts by weight of free radical photo initiator (bis(2,4,6-trimethylbenzoyl)-phenylphosphineoxide) (Double Bond Chemical, code 819)) was screen-printed onto a 10 cm×10 cm ITO/PET substrate, using a screen printing method, to form a screen dot matrix with an oblate ellipsoid shape, with approximately 800 μm in diameter, approximately 30 μm to 35 μm of height, and approximately 700 μm to 800 μm of space. It was then subjected to UV light (energy of 500 mJ/cm$^2$) for pre-exposure. Next, the same screen dot glue composition was coated onto another ITO/PET substrate by doctor blade, to form the peripheral sealant layer of 75 μm in height, leaving only capillary pores to be filled with liquid crystals subsequently. After that, the ITO/PET substrate with the sealant layers was attached with the ITO/PET substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of lauryl methacrylate (TCI, code LMA), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 2.

Example 7

Preparation of the Light Switchable Layer (7)

First, oligomer (I) was prepared. 142.83 g of solvent propylene glycol monomethyl ether acetate, 188.5 g of liquid bisphenol A epoxy resin (Chang Chun Group, code BE188L), and 75.66 g of acrylate acid are added into a 4-neck reaction flask. The oligomer (I) was then placed in an oil bath of 110° C., followed by adding 1.00 g of N,N-dimethylaminopyridine to react for 10 hours. Next, 152.14 g of tetrahydrophthalic anhydride was added to continue reacting for another 8 hours, to result the oligomer (I) carrying acrylic functional group.

After that, a screen dot glue composition (including 5 parts by weight of urethane acrylate oligomer (viscosity 25,000 cps @ 25° C.) (Sartomer, code CN997), 20 parts by weight of acrylic oligomer (viscosity 20,000 cps to 32,000 cps @ 25° C.) (code DOUBLEMER 3710), 10 parts by weight of polyester acrylate oligomer (viscosity 52,000 cps @ 25° C.) (code CN2200), 60 parts by weight of oligomer (I), 5 parts by weight of free radical photo initiator (bis(2, 4,6-trimethylbenzoyl)-phenylphosphineoxide) (Double Bond Chemical, code 819)) was coated onto a 10 cm×10 cm ITO/glass substrate, using coil bar. Next, the device was placed in an oven at 80° C. for 30 minutes to remove the solvent. After that, it was subjected to UV light (energy of 500 mJ/cm$^2$) for exposure through a PET photomask (100 μm opening). After exposure, it was developed with 1% of Na$_2$CO$_3$ (aq), under ambient condition of 28° C. to 30° C., to form a screen dot matrix with an oblate ellipsoid shape, with approximately 100 μm in diameter, approximately 20 μm to 25 μm of height, and approximately 700 μm to 800 μm of space. Next, the screen dot glue composition from Example 1 was coated onto another ITO/glass substrate by doctor blade, to form the peripheral sealant layer of 25 μm in height, leaving only capillary pores to be filled with liquid crystal subsequently. After that, the ITO/glass substrate with the sealant layers was attached with the ITO/glass substrate exposed and developed with the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of ethoxylated bisphenol A dimethacrylate (Sartomer, code SR601), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 2.

Example 8

Preparation of the Light Switchable Layer (8)

First, a screen dot glue composition of solvent type was prepared. 142.83 g of solvent propylene glycol monomethyl ether acetate, 20 parts by weight of liquid bisphenol A epoxy resin (Chang Chun Group, code BE501), 50 parts by weight of bisphenol F epoxy resin (DIC, code 830S), and 25 parts by weight of bisphenol A/F (50/50) epoxy resin (Mitsubishi Chemical, code 4250) were added into the 4-neck reaction flask, placed in an oil bath of 130° C., and continuously stirred until the resin powder was completely dissolved. Then, 5 parts by weight of cation photo initiator (including diphenyl(4-phenylthio)phenylsulfonium hexafluoroatimonate, (thiodi-4,1-phenylene)bis(diphenylsufonium) dihexafluoroatimonate) (code 1176)) was added to complete the manufacture of the screen dot glue composition of solvent type.

After that, the screen dot glue composition of solvent type mentioned above was coated onto a 10 cm×10 cm ITO/glass substrate, using coil bar. Next, the device was placed in an oven at 80° C. for 30 minutes to remove the solvent. After that, it was subjected to UV light (energy of 6 J/cm$^2$) for exposure through a PET photomask (100 m opening), and soft-bake for 30 minutes in an oven at 120° C. After exposure, it was developed with γ-butyrolactone, under ambient condition of 30° C. to 40° C., to form a screen dot matrix with an oblate ellipsoid shape, with approximately 100 μm in diameter, approximately 20 μm to 25 μm of height, and approximately 700 μm to 800 μm of space. Next, the screen dot glue composition from Example 1 was coated onto another ITO/glass substrate by doctor blade, to form the peripheral sealant layer of 25 μm in height, leaving only capillary pores to be filled with liquid crystals subsequently. After that, the ITO/glass substrate with the sealant layers was attached with the ITO/glass substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of lauryl methacrylate (TCI, code LMA), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 2.

Comparative Example 1

Preparation of the Light Switchable Layer

First, the screen dot glue composition from Example 1 was coated onto a 10 cm×10 cm ITO/glass substrate, by doctor blade, to form the peripheral sealant layer of 25 μm in height, leaving only capillary pores to be filled with liquid crystals subsequently. After that, the ITO/glass substrate with the sealant layers was attached with the ITO/glass substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of ethoxylated bisphenol A dimethacrylate (Sartomer, code SR601), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with a haze meter (Nippon Denshoku, NDH-7000), under conditions of no voltage applied (0V) and applying an external voltage (20V), respectively. Relevant preparation conditions and measurement results are summarized in Table 2.

Comparative Example 2

Preparation of the Light Switchable Layer

First, the screen dot glue composition from Example 2 was coated onto a 10 cm×10 cm ITO/glass substrate, by doctor blade, to form the peripheral sealant layer of 100 μm in height, leaving only capillary pores to be filled with liquid crystals subsequently. After that, the ITO/glass substrate with the sealant layers was attached with the ITO/glass substrate having the matrix dots thereon, and was secured with British clip. After exposure with UV light (energy of 6 J/cm$^2$), the manufacture of a liquid-crystal cell was completed.

Next, the liquid-crystal cell was filled with the PSLC compound prepared beforehand (including 95 parts by weight of negative nematic liquid crystals (ne=1.6567, Δn=0.1647 at λ=589 nm; Δε=−5.7 at f=1 kHz) (Merck, code ZLI-4788), 4.5 parts by weight of lauryl methacrylate (TCI, code LMA), 0.5 parts by weight of free radical photo initiator (1-hydroxy-cyclohexyl-phenyl-ketone) (Double Bond Chemical, code 184)) by capillarity action, followed by sealing the cell with the screen dot glue composition mentioned above. After exposure to UV light (energy of 1 J/cm$^2$), the device was placed in an oven at 80° C. for post-cure process of 30 minutes, to complete the preparation of the light switchable device, of the present example. After that, the haze change of the light switchable layer in the light switchable device was measured with haze meter (Nippon Denshoku, NDH-7000), under conditions of no voltage applied (0V) and applying an external voltage (20V), respectively. Relevant preparation conditions and measurement results are summarized in Table 2.

TABLE 1

| Composition | | Example 1 | Example 2 | Example 3 | Example 4 | Example 5 |
|---|---|---|---|---|---|---|
| Negative liquid | ZLI-4788 | 95 | 95 | 95 | 95 | 95 |
| crystal | LMA | 4.5 | 4.5 | | | |
| compound | SR601 | | | 4.5 | 4.5 | 4.5 |
| | 184 | 0.5 | 0.5 | 0.5 | 0.5 | 0.5 |
| Screen dot glue | BE501 | 60 | | | 55 | 60 |

TABLE 1-continued

| Composition | | Example 1 | Example 2 | Example 3 | Example 4 | Example 5 |
|---|---|---|---|---|---|---|
| composition | 830S | 36 | | | | 36 |
| | EPA5001 | | | | 41 | |
| | 4250 | | | | | |
| | 1176 | 4 | | | 4 | 4 |
| | CN997 | | 40 | 35 | | |
| | DOUBLEMER 3710 | | 45 | 40 | | |
| | CN2200 | | 10 | 20 | | |
| | Oligomer (I) | | | | | |
| | 819 | | 5 | 5 | | |
| Screen dot | | Dimension | | | | |
| shape | Oblate ellipsoid (diameter) ~100 μm | | | | | |
| | ~200 μm | ○ | | | | |
| | ~800 μm | | | ○ | | |
| | Square-cylindrical (side length) ~500 μm | | ○ | | | |
| | Cuboid (short-side length) 200 μm~500 μm | | | | ○ | |
| | Irregular (diagonal length) 0.8 mm~5.0 mm | | | | | ○ |
| Screen dot height | 8 μ~10 μm | ○ | | | | |
| | 20 μ~25 μm | | | | | |
| | 30 μ~35 μm | | ○ | ○ | | |
| | 70 μm~80 μm | | | | ○ | ○ |
| Screen dot spacing | 700 μm~800 μm | ○ | ○ | ○ | | |
| | 1.6 mm~2.0 mm | | | | ○ | |
| | 10 mm~15 mm | | | | | ○ |
| Haze Density (0 V) | | 2.0 | 2.5 | 2.1 | 5.7 | 3.3 |
| Haze Density (20 V) | | 68.8 | 71.4 | 70.3 | 60.8 | 66.9 |

TABLE 2

| Composition | | Example 6 | Example 7 | Example 8 | Comparative Example 1 | Comparative Example 2 |
|---|---|---|---|---|---|---|
| Negative liquid crystal compound | ZLI-4788 | 95 | 95 | 95 | 95 | 95 |
| | LMA | 4.5 | | 4.5 | | 4.5 |
| | SR601 | | 4.5 | | 4.5 | |
| | 184 | 0.5 | 0.5 | 0.5 | 0.5 | 0.5 |
| Screen dot glue composition | BE501 | 50 | | 20 | | |
| | 830S | 20 | | 50 | | |
| | EPA5001 | | | | | |
| | 4250 | | | 25 | | |
| | 1176 | 3 | | 5 | | |
| | CN997 | 10 | 5 | | | |
| | DOUBLEMER 3710 | 15 | 20 | | | |
| | CN2200 | | 10 | | | |
| | Oligomer (I) | | 60 | | | |
| | 819 | 2 | 5 | | | |
| Screen dot | | Dimension | | | | |
| shape | Oblate ellipsoid (diameter) ~100 μm | | ○ | ○ | | |
| | ~200 μm | | | | | |
| | ~800 μm | ○ | | | | |
| | Square-cylindrical (side length) ~500 μm | | | | | |
| | Cuboid (short-side length) 200 μm~500 μm | | | | | |
| | Irregular (diagonal length) 0.8 mm~5.0 mm | | | | | |
| Screen dot height | 8 μ~10 μm | | | | | |
| | 20 μ~25 μm | | ○ | ○ | | |
| | 30 μ~35 μm | ○ | | | | |
| | 70 μm~80 μm | | | | | |

TABLE 2-continued

| Composition | | Example 6 | Example 7 | Example 8 | Comparative Example 1 | Comparative Example 2 |
|---|---|---|---|---|---|---|
| Screen dot spacing | 700 μm~800 μm | ○ | ○ | ○ | | |
| | 1.6 mm~2.0 mm | | | | | |
| | 10 mm~15 mm | | | | | |
| Haze Density (0 V) | | 3.96 | 1.99 | 2.00 | 1.90 | 1.95 |
| Haze Density (20 V) | | 65.3 | 70.3 | 70.8 | 1.90 | 1.95 |

It can be seen in the results of the examples and comparative examples in Table 1 and Table 2, the liquid-crystal cell, with alignment structures (screen dots) disposed on the conductive layer, can all appear transparent under 0V bias voltage, and they can appear to be in a haze state under 20V bias voltage. However, the liquid-crystal cell, without alignment structures (screen dots) disposed on the conductive layer, whether under 0V bias voltage or 20V bias voltage, all appear to be in transparent state (or no switchable effect). The present disclosure disposes alignment structures (screen dots) between the first conductive layer and the second conductive layer, and fills negative liquid crystal composition between the first conductive layer, the second conductive layer, and alignment structures (screen dots), to manufacture PSLC light switchable device.

Although several preferred examples of the present disclosure have been disclosed above, but they are not intended to limit the scope of the present disclosure. It should be understood that any of those skilled in the art may make changes, replacements, and retouches without departing from the spirit and scope of the disclosure. Therefore, the scope of the disclosure should be based on the scope of the claims listed below.

What is claimed is:

1. A light switchable device, comprising:
a first conductive layer;
a second conductive layer disposed opposite the first conductive layer;
a sealant layer disposed between the first conductive layer and the second conductive layer, and the first conductive layer, the second conductive layer, and the sealant layer form a closed space; and
a light switchable layer disposed in the closed space, wherein the light switchable layer comprises a plurality of alignment structures and polymer-stabilized liquid crystal (PSLC), wherein the plurality of alignment structures are configured to transform the PSLC to be perpendicular to the orientation of the plurality of alignment structures under voltage appliance, the plurality of alignment structures is a non-continuous phase disposed on the first conductive layer or the second conductive layer, and the PSLC is distributed between the plurality of alignment structures, wherein the first conductive layer, the second conductive layer, and the plurality of alignment structures are in direct contact with the PSLC, and a height of the plurality of alignment structures is lower than a height of the sealant layer, and greater than or equal to 5% of the height of the sealant layer.

2. The light switchable device of claim 1, wherein the first conductive layer and the second conductive layer comprise indium tin oxide (ITO).

3. The light switchable device of claim 1, wherein the height of the sealant layer is between 5 μm and 100 μm.

4. The light switchable device of claim 1, wherein materials of the plurality of alignment structures comprise epoxy resin, acrylate resin, or a combination thereof.

5. The light switchable device of claim 4, wherein materials of the plurality of alignment structures comprise bisphenol A epoxy resin, hydrogenated bisphenol A epoxy resin, bisphenol F epoxy resin, hydrogenated bisphenol F epoxy resin, aliphatic epoxy resin, cycloaliphatic epoxy resin, or a combination thereof.

6. The light switchable device of claim 4, wherein materials of the plurality of alignment structures comprise polyurethane acrylate, polyester acrylate, polyacrylic acid, epoxy acrylate, or a combination thereof.

7. The light switchable device of claim 1, wherein the plurality of alignment structures comprise a cylindrical shape, a cuboid shape, an oblate ellipsoid shape, a square-cylindrical shape, a diamond shape, or an irregular shape.

8. The light switchable device of claim 7, wherein the plurality of alignment structures are cylindrical or oblate ellipsoid-shaped with a diameter between 50 μm and 800 μm.

9. The light switchable device of claim 7, wherein the plurality of alignment structures are cuboid-shaped or square-cylindrical-shaped with a side length between 200 μm and 500 μm.

10. The light switchable device of claim 7, wherein the plurality of alignment structures are diamond-shaped or irregularly shaped with a diagonal length between 0.8 mm and 5.0 mm.

11. The light switchable device of claim 1, wherein a space between the plurality of alignment structures is between 500 μm and 15 mm.

12. The light switchable device of claim 1, wherein a sum of bottom areas of the plurality of alignment structures is between 3% and 65% of a total area of the light switchable device.

* * * * *